(12) United States Patent
Parrott et al.

(10) Patent No.: US 7,815,507 B2
(45) Date of Patent: Oct. 19, 2010

(54) GAME MACHINE USER INTERFACE USING A NON-CONTACT EYE MOTION RECOGNITION DEVICE

(75) Inventors: Greg Parrott, Reno, NV (US); Binh T. Nguyen, Reno, NV (US); Craig A. Paulsen, Reno, NV (US); Dung K. Hua, Sparks, NV (US)

(73) Assignee: IGT, Reno, NV (US)

( * ) Notice: Subject to any disclaimer, the term of this patent is extended or adjusted under 35 U.S.C. 154(b) by 970 days.

(21) Appl. No.: 10/871,068

(22) Filed: Jun. 18, 2004

(65) Prior Publication Data

US 2005/0282603 A1 Dec. 22, 2005

(51) Int. Cl.
*G06F 17/00* (2006.01)
*G06F 19/00* (2006.01)

(52) U.S. Cl. .......................... 463/36; 463/16; 463/20; 463/39; 351/210; 345/157; 345/158

(58) Field of Classification Search ............. 463/36–39, 463/16–20; 351/210; 345/157–158
See application file for complete search history.

(56) References Cited

U.S. PATENT DOCUMENTS

| | | | |
|---|---|---|---|
| 3,662,105 A | 5/1972 | Hurst et al. | |
| 3,697,698 A | 10/1972 | Oswald et al. | |
| 3,724,932 A * | 4/1973 | Cornsweet et al. | 351/210 |
| 3,986,030 A * | 10/1976 | Teltscher | 250/349 |
| 4,071,689 A | 1/1978 | Talmage et al. | |
| 4,072,930 A | 2/1978 | Lucero et al. | |
| 4,109,145 A * | 8/1978 | Graf | 250/221 |
| 4,283,709 A | 8/1981 | Lucero et al. | |
| 4,339,798 A | 7/1982 | Hedges et al. | |
| 4,348,696 A | 9/1982 | Beier | |
| 4,553,222 A | 11/1985 | Kurland et al. | |
| 4,595,990 A * | 6/1986 | Garwin et al. | 708/141 |
| 4,836,670 A * | 6/1989 | Hutchinson | 351/210 |
| 4,837,728 A | 6/1989 | Barrie et al. | |
| 4,856,787 A | 8/1989 | Itkis | |

(Continued)

FOREIGN PATENT DOCUMENTS

AU 704691 4/1997

(Continued)

OTHER PUBLICATIONS

J. Eric Townsend, et al., 11 page document entitled "Mattel Power Glove FAQ version 0.1, May 7, 1993" http://www.ccs.new.edu/home/ivan/pglove/faq-0.1.html.

(Continued)

*Primary Examiner*—Peter DungBa Vo
*Assistant Examiner*—Milap Shah
(74) *Attorney, Agent, or Firm*—Weaver Austin Villeneuve & Sampson LLP

(57) ABSTRACT

A gaming machine having a non-contact user interface and methods for receiving input to the gaming machine using the non-contact user interface are described. The gaming machine described can receive player tracking information associated with a player, where the player tracking information can include personalization information associated with the player. The gaming machine can receive a signal provided by the player at a non-contact interface device. Next, the gaming machine can decode the signal.

7 Claims, 11 Drawing Sheets

U.S. PATENT DOCUMENTS

| | | | |
|---|---|---|---|
| 4,950,069 A * | 8/1990 | Hutchinson | 351/210 |
| 4,973,149 A * | 11/1990 | Hutchinson | 351/210 |
| 5,033,744 A * | 7/1991 | Bridgeman et al. | 463/13 |
| 5,038,022 A | 8/1991 | Lucero | |
| 5,042,809 A | 8/1991 | Richardson | |
| 5,048,831 A | 9/1991 | Sides | |
| 5,116,055 A | 5/1992 | Tracy | |
| 5,179,517 A | 1/1993 | Sarbin et al. | |
| 5,280,809 A | 1/1994 | Tive | |
| 5,288,078 A * | 2/1994 | Capper et al. | 463/39 |
| 5,367,315 A * | 11/1994 | Pan | 345/156 |
| 5,371,345 A | 12/1994 | LeStrange et al. | |
| 5,429,361 A | 7/1995 | Raven et al. | |
| 5,470,079 A | 11/1995 | LeStrange et al. | |
| 5,474,082 A * | 12/1995 | Junker | 600/545 |
| 5,517,021 A * | 5/1996 | Kaufman et al. | 250/221 |
| 5,536,016 A | 7/1996 | Thompson | |
| 5,577,731 A | 11/1996 | Jones | |
| 5,605,334 A | 2/1997 | McCrea, Jr. | |
| 5,616,078 A * | 4/1997 | Oh | 463/8 |
| 5,618,045 A | 4/1997 | Kagan et al. | |
| 5,638,826 A * | 6/1997 | Wolpaw et al. | 600/544 |
| 5,643,086 A | 7/1997 | Alcorn et al. | |
| 5,655,961 A | 8/1997 | Acres et al. | |
| 5,702,304 A | 12/1997 | Acres et al. | |
| 5,704,836 A | 1/1998 | Norton et al. | |
| 5,716,273 A | 2/1998 | Yuen | |
| 5,718,632 A | 2/1998 | Hayashi | |
| 5,741,183 A | 4/1998 | Acres et al. | |
| 5,759,102 A | 6/1998 | Pease et al. | |
| 5,761,647 A | 6/1998 | Boushy | |
| 5,766,076 A | 6/1998 | Pease et al. | |
| 5,768,382 A | 6/1998 | Schneier et al. | |
| 5,769,716 A | 6/1998 | Saffari et al. | |
| 5,770,533 A | 6/1998 | Franchi | |
| 5,779,545 A | 7/1998 | Berg et al. | |
| 5,788,573 A | 8/1998 | Baerlocher et al. | |
| 5,795,228 A | 8/1998 | Trumbull et al. | |
| 5,796,389 A | 8/1998 | Bertram et al. | |
| 5,797,085 A | 8/1998 | Beuk et al. | |
| 5,803,809 A | 9/1998 | Yoseloff | |
| 5,809,482 A | 9/1998 | Strisower | |
| 5,811,772 A | 9/1998 | Lucero | |
| 5,816,918 A | 10/1998 | Kelly et al. | |
| 5,818,954 A * | 10/1998 | Tomono et al. | 382/115 |
| 5,833,536 A | 11/1998 | Davids et al. | |
| 5,833,540 A | 11/1998 | Miodunski et al. | |
| 5,844,824 A * | 12/1998 | Newman et al. | 345/156 |
| 5,851,148 A | 12/1998 | Brune et al. | |
| 5,855,515 A | 1/1999 | Pease et al. | |
| 5,871,398 A | 2/1999 | Schneier et al. | |
| D406,612 S | 3/1999 | Johnson | |
| 5,885,158 A | 3/1999 | Torango et al. | |
| 5,892,566 A * | 4/1999 | Bullwinkel | 351/210 |
| 5,910,048 A | 6/1999 | Feinberg | |
| 5,919,091 A | 7/1999 | Bell et al. | |
| 5,951,397 A | 9/1999 | Dickinson | |
| 5,954,583 A | 9/1999 | Green | |
| 5,957,776 A | 9/1999 | Hoehne | |
| 5,967,896 A | 10/1999 | Jorasch et al. | |
| 5,971,271 A | 10/1999 | Wynn et al. | |
| 5,984,779 A | 11/1999 | Bridgeman et al. | |
| 5,999,808 A | 12/1999 | LaDue | |
| 6,001,016 A | 12/1999 | Walker et al. | |
| 6,003,013 A | 12/1999 | Boushy et al. | |
| 6,003,651 A | 12/1999 | Waller et al. | |
| 6,010,404 A | 1/2000 | Walker et al. | |
| 6,012,832 A | 1/2000 | Saunders et al. | |
| 6,012,983 A | 1/2000 | Walker et al. | |
| 6,038,666 A | 3/2000 | Hsu et al. | |
| 6,048,269 A | 4/2000 | Burns et al. | |
| 6,050,895 A | 4/2000 | Luciano, Jr. et al. | |
| 6,062,981 A | 5/2000 | Luciano, Jr. et al. | |
| 6,068,552 A | 5/2000 | Walker et al. | |
| 6,077,163 A | 6/2000 | Walker et al. | |
| 6,089,975 A | 7/2000 | Dunn | |
| 6,099,408 A | 8/2000 | Schneier et al. | |
| 6,104,815 A | 8/2000 | Alcorn et al. | |
| 6,106,396 A | 8/2000 | Alcorn et al. | |
| 6,110,041 A | 8/2000 | Walker et al. | |
| 6,110,043 A | 8/2000 | Olsen | |
| 6,113,492 A | 9/2000 | Walker et al. | |
| 6,113,493 A | 9/2000 | Walker et al. | |
| 6,113,495 A | 9/2000 | Walker et al. | |
| 6,135,884 A | 10/2000 | Hedrick et al. | |
| 6,135,887 A | 10/2000 | Pease et al. | |
| 6,139,431 A | 10/2000 | Walker et al. | |
| 6,142,876 A | 11/2000 | Cumbers | |
| 6,146,273 A | 11/2000 | Olsen | |
| 6,149,522 A | 11/2000 | Alcorn et al. | |
| 6,161,059 A | 12/2000 | Tedesco et al. | |
| 6,162,121 A | 12/2000 | Morro et al. | |
| 6,162,122 A | 12/2000 | Acres et al. | |
| 6,168,522 B1 | 1/2001 | Walker et al. | |
| 6,174,234 B1 | 1/2001 | Seibert, Jr. et al. | |
| 6,182,221 B1 | 1/2001 | Hsu et al. | |
| 6,183,362 B1 | 2/2001 | Boushy | |
| 6,190,256 B1 | 2/2001 | Walker et al. | |
| 6,191,773 B1 * | 2/2001 | Maruno et al. | 345/158 |
| 6,210,279 B1 | 4/2001 | Dickinson | |
| 6,227,972 B1 | 5/2001 | Walker et al. | |
| 6,234,900 B1 | 5/2001 | Cumbers | |
| 6,244,958 B1 | 6/2001 | Acres | |
| 6,247,643 B1 | 6/2001 | Lucero | |
| 6,253,119 B1 | 6/2001 | Dabrowski | |
| 6,264,560 B1 | 7/2001 | Goldberg et al. | |
| 6,264,561 B1 | 7/2001 | Saffari et al. | |
| 6,267,671 B1 | 7/2001 | Hogan | |
| 6,270,410 B1 | 8/2001 | DeMar et al. | |
| 6,280,328 B1 | 8/2001 | Holch et al. | |
| 6,285,868 B1 | 9/2001 | LeDue | |
| 6,293,866 B1 | 9/2001 | Walker et al. | |
| 6,302,790 B1 | 10/2001 | Brossard | |
| 6,307,956 B1 | 10/2001 | Black | |
| 6,313,871 B1 | 11/2001 | Schubert | |
| 6,319,125 B1 | 11/2001 | Acres | |
| 6,341,353 B1 | 1/2002 | Herman et al. | |
| 6,346,044 B1 | 2/2002 | McCrea, Jr. | |
| 6,368,216 B1 | 4/2002 | Hedrick et al. | |
| 6,371,852 B1 | 4/2002 | Acres | |
| 6,379,246 B1 | 4/2002 | Dabrowski | |
| 6,383,076 B1 | 5/2002 | Tiedeken | |
| 6,409,595 B1 | 6/2002 | Uihlein et al. | |
| 6,409,602 B1 | 6/2002 | Wiltshire et al. | |
| 6,439,993 B1 | 8/2002 | O'Halloran | |
| 6,443,843 B1 | 9/2002 | Walker et al. | |
| 6,450,885 B2 | 9/2002 | Schneier et al. | |
| 6,471,591 B1 | 10/2002 | Crumby | |
| 6,488,585 B1 | 12/2002 | Wells et al. | |
| 6,511,376 B2 | 1/2003 | Walker et al. | |
| 6,511,377 B1 | 1/2003 | Weiss | |
| 6,519,607 B1 | 2/2003 | Mahoney et al. | |
| 6,530,835 B1 | 3/2003 | Walker et al. | |
| 6,554,705 B1 | 4/2003 | Cumbers | |
| 6,561,903 B2 | 5/2003 | Walker et al. | |
| 6,582,310 B1 | 6/2003 | Walker et al. | |
| 6,585,592 B1 | 7/2003 | Crumby | |
| 6,599,193 B2 | 7/2003 | Baerlocher et al. | |
| 6,607,443 B1 * | 8/2003 | Miyamoto et al. | 463/40 |
| 6,628,939 B2 | 9/2003 | Paulsen | |
| 6,629,890 B2 | 10/2003 | Johnson | |
| 6,637,883 B1 * | 10/2003 | Tengshe et al. | 351/210 |
| 6,651,985 B2 | 11/2003 | Sines et al. | |
| 6,676,522 B2 | 1/2004 | Rowe et al. | |

| | | |
|---|---|---|
| 6,682,421 B1 | 1/2004 | Rowe et al. |
| 6,685,480 B2 * | 2/2004 | Nishimoto et al. .......... 434/247 |
| 6,685,567 B2 | 2/2004 | Cockerille et al. |
| 6,712,698 B2 | 3/2004 | Paulsen et al. |
| 6,722,985 B2 | 4/2004 | Criss-Puszkiewicz et al. |
| 6,739,975 B2 | 5/2004 | Nguyen et al. |
| 6,743,097 B2 | 6/2004 | Walker et al. |
| 6,776,715 B2 | 8/2004 | Price |
| 6,783,459 B2 | 8/2004 | Cumbers |
| 6,800,029 B2 | 10/2004 | Rowe et al. |
| 6,801,188 B2 * | 10/2004 | Longobardi .................. 345/156 |
| 6,830,515 B2 | 12/2004 | Rowe |
| 6,846,238 B2 | 1/2005 | Wells |
| 6,852,031 B1 | 2/2005 | Rowe |
| 6,863,609 B2 * | 3/2005 | Okuda et al. .................. 463/36 |
| 6,866,586 B2 | 3/2005 | Rowe et al. |
| 6,884,170 B2 | 4/2005 | Rowe |
| 6,908,387 B2 * | 6/2005 | Hedrick et al. ................. 463/31 |
| 6,921,332 B2 * | 7/2005 | Fukunaga et al. .............. 463/8 |
| 6,922,276 B2 | 7/2005 | Zhang et al. |
| 6,965,868 B1 | 11/2005 | Bednarek |
| 6,997,807 B2 | 2/2006 | Weiss |
| 7,001,277 B2 | 2/2006 | Walker et al. |
| 7,022,017 B1 | 4/2006 | Halbritter et al. |
| 7,035,626 B1 | 4/2006 | Luciano, Jr. |
| 7,083,518 B2 | 8/2006 | Rowe |
| 7,112,138 B2 | 9/2006 | Hedrick et al. |
| 7,128,651 B2 * | 10/2006 | Miyamoto et al. ............ 463/35 |
| 7,168,089 B2 | 1/2007 | Nguyen et al. |
| 7,217,190 B2 | 5/2007 | Weiss |
| 7,275,991 B2 | 10/2007 | Burns et al. |
| 2001/0000118 A1 | 4/2001 | Sines et al. |
| 2001/0028147 A1 | 10/2001 | Ornstein et al. |
| 2001/0031663 A1 | 10/2001 | Johnson |
| 2001/0039204 A1 | 11/2001 | Tanskanen |
| 2001/0040572 A1 * | 11/2001 | Bradski et al. ............... 345/419 |
| 2002/0022518 A1 * | 2/2002 | Okuda et al. .................. 463/36 |
| 2002/0042297 A1 | 4/2002 | Torango |
| 2002/0098888 A1 | 7/2002 | Rowe et al. |
| 2002/0103027 A1 | 8/2002 | Rowe et al. |
| 2002/0107066 A1 | 8/2002 | Seelig et al. |
| 2002/0133418 A1 | 9/2002 | Hammond et al. |
| 2002/0142824 A1 | 10/2002 | Kazaoka et al. |
| 2002/0142825 A1 | 10/2002 | Lark et al. |
| 2002/0142844 A1 | 10/2002 | Kerr |
| 2002/0142846 A1 | 10/2002 | Paulsen |
| 2002/0147047 A1 | 10/2002 | Letovsky et al. |
| 2002/0198052 A1 | 12/2002 | Soltys et al. |
| 2003/0003988 A1 | 1/2003 | Walker et al. |
| 2003/0017872 A1 * | 1/2003 | Oishi et al. .................... 463/33 |
| 2003/0027632 A1 | 2/2003 | Sines et al. |
| 2003/0032485 A1 | 2/2003 | Cockerille et al. |
| 2003/0045354 A1 * | 3/2003 | Giobbi ......................... 463/40 |
| 2003/0050806 A1 | 3/2003 | Friesen et al. |
| 2003/0054881 A1 | 3/2003 | Hedrick et al. |
| 2003/0069071 A1 | 4/2003 | Britt et al. |
| 2003/0078101 A1 | 4/2003 | Schneider et al. |
| 2003/0078103 A1 | 4/2003 | LeMay et al. |
| 2003/0083132 A1 | 5/2003 | Berg et al. |
| 2003/0083943 A1 | 5/2003 | Adams et al. |
| 2003/0100361 A1 | 5/2003 | Sharpless et al. |
| 2003/0109308 A1 | 6/2003 | Rowe |
| 2003/0148808 A1 | 8/2003 | Price |
| 2003/0148812 A1 | 8/2003 | Paulsen et al. |
| 2003/0162593 A1 * | 8/2003 | Griswold ...................... 463/39 |
| 2003/0179229 A1 * | 9/2003 | Van Erlach et al. .......... 345/744 |
| 2003/0190944 A1 | 10/2003 | Manfredi |
| 2003/0203756 A1 | 10/2003 | Jackson |
| 2003/0228898 A1 * | 12/2003 | Rowe ........................... 463/25 |
| 2004/0029635 A1 * | 2/2004 | Giobbi ......................... 463/30 |
| 2004/0043814 A1 | 3/2004 | Angell et al. |
| 2004/0053675 A1 * | 3/2004 | Nguyen et al. ............... 463/20 |
| 2004/0063480 A1 * | 4/2004 | Wang ............................ 463/8 |
| 2004/0063481 A1 * | 4/2004 | Wang ............................ 463/8 |
| 2004/0082385 A1 | 4/2004 | Silva et al. |
| 2004/0085293 A1 | 5/2004 | Soper et al. |
| 2004/0087370 A1 | 5/2004 | Tarantino |
| 2004/0092310 A1 | 5/2004 | Brosnan et al. |
| 2004/0116174 A1 | 6/2004 | Baerlocher et al. |
| 2004/0147314 A1 | 7/2004 | LeMay et al. |
| 2004/0189720 A1 * | 9/2004 | Wilson et al. ................ 345/863 |
| 2004/0193413 A1 * | 9/2004 | Wilson et al. ................ 704/243 |
| 2004/0199284 A1 | 10/2004 | Hara |
| 2004/0251630 A1 | 12/2004 | Sines et al. |
| 2004/0254006 A1 | 12/2004 | Lam et al. |
| 2005/0076242 A1 | 4/2005 | Breuer |
| 2005/0143169 A1 | 6/2005 | Nguyen et al. |
| 2005/0255911 A1 | 11/2005 | Nguyen et al. |
| 2005/0255922 A1 | 11/2005 | Nguyen et al. |
| 2005/0261059 A1 | 11/2005 | Nguyen et al. |
| 2005/0261060 A1 | 11/2005 | Nguyen et al. |
| 2005/0261061 A1 | 11/2005 | Nguyen et al. |
| 2006/0040730 A1 | 2/2006 | Walker et al. |
| 2006/0052109 A1 | 3/2006 | Ashman et al. |
| 2006/0058091 A1 | 3/2006 | Crawford, III et al. |
| 2006/0073888 A1 | 4/2006 | Nguyen et al. |
| 2006/0079333 A1 | 4/2006 | Morrow et al. |
| 2006/0189367 A1 | 8/2006 | Nguyen et al. |
| 2006/0189382 A1 | 8/2006 | Muir et al. |
| 2007/0004510 A1 | 1/2007 | Underdahl et al. |
| 2007/0021198 A1 | 1/2007 | Muir et al. |
| 2007/0052636 A1 | 3/2007 | Kalt et al. |
| 2007/0259716 A1 | 11/2007 | Mattice et al. |
| 2007/0259717 A1 | 11/2007 | Mattice et al. |

FOREIGN PATENT DOCUMENTS

| | | |
|---|---|---|
| CN | 1969301 | 5/2007 |
| DE | 100 34 275 | 1/2002 |
| EP | 0 698 858 | 2/1996 |
| EP | 0 744 786 | 11/1996 |
| EP | 0 769 769 | 4/1997 |
| EP | 0 924 657 | 6/1999 |
| EP | 1 120 757 | 8/2001 |
| EP | 1 231 577 | 8/2002 |
| EP | 1 482 459 | 12/2004 |
| EP | 1 494 182 | 5/2005 |
| GB | 2 284 913 | 6/1995 |
| GB | 2429564 | 2/2007 |
| JP | 07-299248 | 11/1995 |
| WO | 95/24689 | 9/1995 |
| WO | 96/00950 | 1/1996 |
| WO | 98/50876 | 11/1998 |
| WO | 98/58509 | 12/1998 |
| WO | 99/10061 | 3/1999 |
| WO | 01/00291 | 1/2001 |
| WO | 01/01379 | 1/2001 |
| WO | 01/03786 | 1/2001 |
| WO | 01/27759 | 4/2001 |
| WO | 01/48712 | 5/2001 |
| WO | 01/76710 | 10/2001 |
| WO | 02/24288 | 3/2002 |
| WO | 02/50652 | 6/2002 |
| WO | 02/055163 | 7/2002 |
| WO | 02/058020 | 7/2002 |
| WO | 03/019486 | 3/2003 |
| WO | 03/084623 | 10/2003 |
| WO | 2004/025595 | 3/2004 |
| WO | 2004/027584 | 4/2004 |
| WO | 2004/056432 | 7/2004 |
| WO | 2004/070591 | 8/2004 |
| WO | 2005/023389 | 3/2005 |
| WO | 2006/009917 | 1/2006 |
| WO | 2006/010011 | 1/2006 |
| WO | 2006/090197 | 8/2006 |
| WO | 2008/028148 | 3/2008 |

| | | |
|---|---|---|
| WO | 2008/030777 | 3/2008 |
| WO | 2009/009224 | 1/2009 |
| WO | 2009/009225 | 1/2009 |

OTHER PUBLICATIONS

LC Technologies, Inc., 9 page document entitled "The Eyegaze Analysis System, Research Tools" Copyright 2003, http://www.eyegaze.com/2Products/Development/Devlopmentmain.htm.

LC Technologies, Inc., 4 page document entitled "Eyeglaze Technology, Solutions and Applications" Copyright 2003, http://www.eyegaze.com/SOLUTIONS.htm.

Article by Katie Dean, 2 page document entitled "Wired News: Gesture Your Mouse Goodbye" May 28, 2003, http://www.wired.com/new/gizmos/0,1452,58978,00.html.

Article, Canesta, Inc., 1 page document entitled "Getting Started With Canesta, Device Prototyping Program" Copyright 2002, Canesta, Inc., http://www.canesta.com/devtools.htm.

International Search Report and Written Opinion dated Sep. 29, 2005, from corresponding PCT Application No. PCT/US2005/021605 (9 pages).

Examination Report from British Patent Application No. GB0625344.7, dated Oct. 5, 2007 (3 pages).

International Preliminary Report on Patentability from International Patent Application No. PCT/US2005/021605, dated Dec. 20, 2006.

International Search Report from International Patent Application No. PCT/US2008/064776, dated Sep. 29, 2008.

Written Opinion from International Patent Application No. PCT/US2008/064776, dated Sep. 29, 2008.

Fischetti, Mark., At Your Fingertips—Touch Screens, Apr. 2001, Scientific American, pp. 102-103.

Bricklin, Dan., About Tablet Computing Old and New, Nov. 22, 2002; http://www.bricklin com/tablecomputing.htm (pp. 1-7).

Bravo-Escos, Miguel., "Networking gets personal," IEE Review Jan. 2002, pp. 32-36.

Saleem, Rae., "Preferred Payment Architecture: Local Payment," Mobey Forum-Mobile Financial Services Ltd., Sep. 2002, Document Version 1.0.

The definition of graphical, The American Heritage Dictionary of the English Language, Third Edition, copyright 1992 by Houghton Mifflin Company.

Wang Z et al., "Casino Technology: Player Tracking and Slot Accounting Systems" Gaming Research and Review Journal, UNLV International Gaming Institute, Las Vegas, NV, U.S.

Yao, Paul., Microsoft Windows CE 2.0: It's Not Just for Handheld PCs Anymore—MSJ, May 1998; www.microsoft.com/msj/0598/wince.aspx (pp. 1-23).

EP Examination Report dated Aug. 19, 2009 from EP Application No. 02773484.7.

First Office Action dated Feb. 13, 2009 from Chinese Application No. 2006800056903.

UK Office Action dated Nov. 7, 2007 for GB Patent Application No. 0625344.7.

CIPO Office Action mailed Apr. 3, 2009 in Application No. 200580020194.0.

Australian Office Action from Application Serial No. 2005265179, dated Jan. 28, 2010.

International Preliminary Report on Patentability from Application Serial No. PCT/US2008/064779, dated Jan. 12, 2010.

International Preliminary Report on Patentability from Application Serial No. PCT/US2008/064776, dated Jan. 12, 2010.

\* cited by examiner

GAME MACHINE USER INTERFACE USING A NON-CONTACT EYE MOTION RECOGNITION DEVICE

BACKGROUND OF THE INVENTION

I. Field of the invention

The present invention relates to gaming machines such as video slot machines and video poker machines. More particularly, the present invention relates to a user interface for a gaming machine.

II. Background

When a person wishes to play a game of chance on a gaming machine, he or she typically inserts cash or other form of credits through a device such as a coin acceptor, bill validator, or cashless ticketing system. Furthermore, at the start of the game, the player may enter player tracking information using the player tracking devices included on the gaming machine, such as by inserting a player tracking card into a card reader or entering information on a keypad.

During the game, the player can typically view game information through a video display. Additional game and prize information may also be displayed on other video display screens that may be located on a player tracking panel or in a top box, if the gaming machine includes such features. During the course of a game, the player may be required to make a number of decisions, which affect the outcome of the game. For instance, the player can use player-input switches, such as buttons, keypads, levers, and the like, to input information regarding these decisions. Specifically, if a player wants to spin the reels of a video slot machine, the player can push a button indicating the amount of credits he or she wishes to bet and another button indicating that he or she would like to spin the reels. Other input devices can be used such as touch screens and the like, which require the player to touch portions of a video display screen to effect such decisions.

Because game play typically involves playing several hands of a game of chance, such as spins, card hands, and the like, players typically engage in repetitive motions that can cause fatigue or even injury. Accordingly, it would be desirable to provide input mechanisms for gaming machines that include improved ergonomic features. Furthermore, it would be desirable to accommodate those with physical impairments who may wish to participate in game play.

SUMMARY OF THE INVENTION

The techniques of the present invention address the above need by providing methods, code and apparatus for a non-contact interface that can be used to provide input to a gaming machine. The non-contact interface can be used to allow more natural motion by players to serve as input into a gaming machine.

One aspect of the present invention provides a gaming machine. The gaming machine may be generally characterized as comprising: 1) a player tracking device configured to receive player tracking information associated with a player; 2) a non-contact interface device configured to receive input signals from the player wherein the input signals are used to play a game of chance on the gaming machine; and 3) a master gaming controller configured to present one or more games of chance, wherein the master gaming controller is configured to receive the input signals and decode the input signals. The master gaming controller may be further configured to decode input signals based on calibration information obtained during a gaming session.

In particular embodiments, the input signals may be decoded using personalization files stored as player tracking information associated with the player, the non-contact interface device may be an eye motion recognition device, a hand motion recognition device, a voice recognition device, image recognition system, virtual keyboard, virtual touch screen, or a combination thereof. The eye motion recognition device may include a video image processing system where the video image processing system includes a camera, lens, and LED. The image recognition system may be adapted for reading lip movements, sign language, or other movements. The hand motion recognition device may be a sensor curtain and the hand motion recognition device may be adapted for detecting motion in two dimensions or three dimensions.

In other embodiments, the non-contact interface device may be configured to receive signals from a peripheral device. The peripheral device may be a personal digital assistant (PDA), cell phone, haptic interface, pointer, a hand-held computing device or a combination thereof. The player tracking device may further comprise one or more of a card reader, a wireless interface, a smart card reader, an RFID tag reader, a bar-code reader, a camera coupled to character recognition software, a microphone coupled to voice recognition software or combination thereof for transmitting player tracking information. The player tracking information may include a player tracking identification number and calibration information for one or more non-contact interfaces used by the player.

Another aspect of the present invention provides a method for receiving input in a gaming machine used to receive wagers on a play of a game of chance. The method may be generally characterized as comprising: 1) receiving player tracking information associated with a player; 2) receiving signals at a non-contact interface device, wherein the signals are provided by the player for playing a game of chance on the gaming machine; 3) decoding the signal and; 4) generating a game of chance using the signals.

In particular embodiments, the player tracking information may include personalization information associated with the player, such as a voice recording or other biometric information. Therefore, the method may further comprise allowing the player to provide personalization information for input to the non-contact interface and storing personalization information as player tracking information. In addition, the method may further displaying input options to the player, wherein the input options allow the player to select a mode of non-contact input to the gaming machine. Further, the method may comprise updating the player tracking information associated with the player based on one or more signals received by the non-contact interface device.

In other embodiment, the method may further comprise calibrating the non-contact interface for a gaming session. Calibration information may be stored as player tracking information. The method may also comprise authenticating the player using personalization information or calibration information stored as player tracking information associated with the player.

In other embodiments, signals received at the non-contact interface device include a cursor signal or a selection signal. The method may further comprise determining whether the selection signal was decoded correctly based on personalization or calibration files associated with the player. In addition, the method may also comprise allowing a player to confirm the selection signal or providing the player with an option to cancel the selection signal. The selection signal may be processed as input to the gaming machine.

The method may also comprise saving the selection signal or other information generated at the non-contact interface as game state information. An interface may be provided for playing back the selection signal in some form. Thus, the method may comprise displaying or outputting the signal in some manner.

Another aspect of the present invention provides a method for receiving input to a gaming machine. The method may be generally characterized as comprising: 1) receiving player tracking information associated with a player, wherein the player tracking information includes personalization information, calibration information, or a combination thereof; 2) receiving a signal at a non-contact interface device, wherein the signal is provided by the player; and 3) decoding the signal using the personalization information, calibration information, or a combination thereof.

Yet another aspect of the invention pertains to computer program products including machine-readable media on which are stored program instructions for implementing a portion of or an entire method as described above. Any of the methods of this invention may be represented, in whole or in part, as program instructions that can be provided on such computer readable media. In addition, the invention pertains to various combinations of data generated and/or used as described herein.

These and other features and advantages of the present invention will be described in more detail below with reference to the associated figures.

DETAILED DESCRIPTION OF INVENTION

As described above in the Background Section, players typically engage in repetitive motions during a gaming session that can cause fatigue or even injury. For instance, a player may play several hands of a video poker game or spin the video slot reels several times during a gaming session. Each poker hand or spin of the reels may require the player to push or otherwise activate various input devices such as buttons, keypads, levers, and the like. Such repetitive motions can lead to fatigue or injury such as a repetitive stress injury.

Accordingly, the present invention provides various embodiments that include non-contact input devices that can receive inputs from a player remotely. For instance, as described in more detail herein, the devices can provide eye motion recognition, hand motion recognition, voice recognition, etc., to receive input from players. By receiving input from players in this manner, the system can allow players to communicate information to the gaming machine more naturally, thereby reducing the amount of fatigue that players experience during gaming sessions. In some embodiments, players can switch between different input modes to further reduce repetition that could lead to injury. For example, a player can begin a gaming session by using hand motion recognition for input, and then switch to voice recognition to prevent fatigue of his or her hands. Furthermore, providing non-contact interfaces on gaming machines can allow people with physical impairments to engage in game play if they so desire. For instance, a player with a hand injury can choose to input information to a gaming machine using an eye recognition interface.

Figure 1:
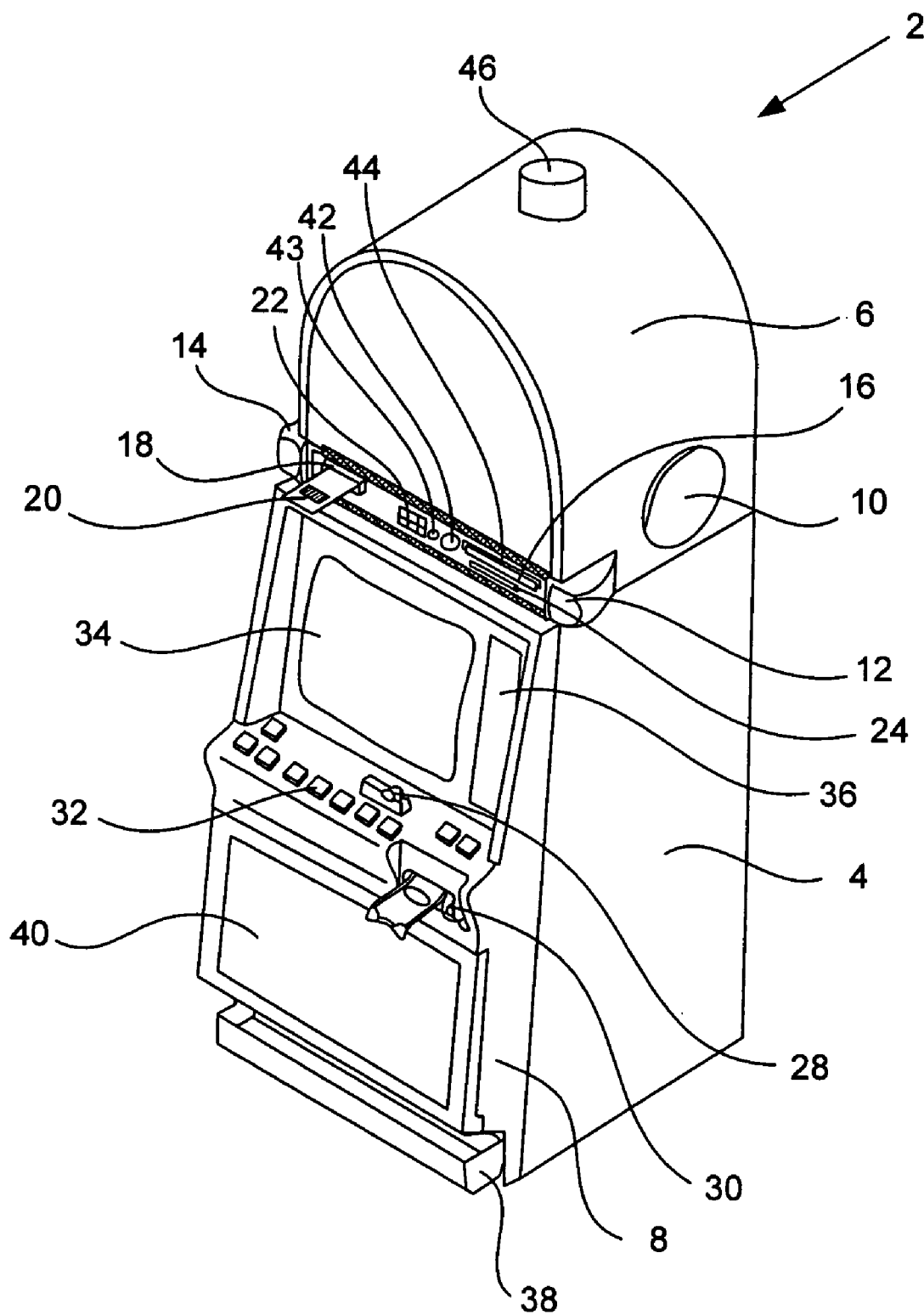
FIG. 1 is a diagrammatic representation of a gaming machine.

With reference now to FIG. 1, shown is a diagrammatic representation of a typical video gaming machine having various player input switches. Machine 2 includes a main cabinet 4, which generally surrounds the machine interior (not shown) and is viewable by users. Main cabinet 4 includes a main door 8 on the front of the machine, which opens to provide access to the interior of the machine. Attached to the main door are player-input switches 32, a coin acceptor 28, a bill validator 30, a coin tray 38, and a belly glass 40. As shown, the player-input switches 32 are buttons that can be activated by pressing them down.

Viewable through the main door is a video display monitor 34 and an information panel 36. The display monitor 34 can be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. These devices are controlled by circuitry housed inside the main cabinet 4 of the machine 2. Many possible games, including mechanical slot games, video slot games, video poker, video blackjack, video pachinko, video bingo, video keno, video card games, lottery, and other games of chance may be presented with the gaming machines and player tracking panels of this invention.

The gaming machine 2 includes a top box 6, which sits on top of the main cabinet 4. The top box 6 houses a number of devices, which may be used to add features to a game being played on the gaming machine 2. In particular, top box 6 can include features such as a top box glass 50 and a lighted candle 46 that may be used for signaling purposes such as to get the attention of various casino personnel. Top box glass 50 can include ornamentation such as graphics, logos, patterns, borders, or the like, which may be applied by a process such as silkscreening, etching, frosting, painting, dying, or the like.

A region located at the base of top box 6, can include devices such as speakers 10, 12, 14, a ticket printer 18 which prints bar-coded tickets 20 and may be part of a cashless ticketing system, a key pad 22 for entering player tracking information such as an identification code, a florescent display 16 for displaying player tracking information, a card reader 24 for inserting a magnetic striped card containing player tracking information or other input devices for entering player tracking information, a speaker/microphone for voice commands and voice recognition, biometric input devices such as finger printer for identifying a player, a video display screen 44 for displaying various types of video content such as player tracking information, machine status, bonus games and primary games, and the like.

It should be recognized that gaming machine 2 is only one exemplary embodiment of a wide range of gaming machine designs that have been implemented. For example, some gaming machines have touch screens that can receive player inputs. Also, some gaming machines are designed for bar tables and have displays that face upwards.

When a user wishes to play the gaming machine 2, he or she inserts cash or other form of credits through the coin acceptor 28 or bill validator 30. In some embodiments, the bill validator may accept a printed ticket voucher as indicia of credit when a cashless ticketing system is used. At the start of the game, the player may enter player tracking information using the player tracking devices included in player tracking assembly 52. For instance, the game player's preferences may be read from a card inserted into the card reader 24. During the game, the player can view game information through video display 34. Other game and prize information may also be displayed on the video display screen 44 located in the player tracking assembly or on other display screens included in top box 6.

During the course of a game, a player may be required to make a number of decisions, which affect the outcome of the game by using devices such as the player-input switches 32, or the video display screen 34. For certain game events, the gaming machine 2 may display visual and auditory effects such as various sounds projected by speakers 10, 12, 14 and flashing lights, strobing lights or other patterns displayed from lights on the gaming machine 2 or from lights behind the belly glass 40 or top glass 50, which add to the excitement of a game and encourage the player to continue playing. After the player has completed a game, the player may receive game tokens from the coin tray 38 or a ticket 20 from the printer 18, which may be used for further games or to redeem a prize. The player may also receive a ticket 20 for food, merchandise, or games from the printer 18. In addition, if the player inserted a player tracking card into card reader 24, the player can retrieve the updated player tracking card from card reader 24.

During a gaming session, a player may repetitively press or otherwise select the player-input switches 32, thereby increasing the risk of fatigue or injury. For instance, if a player sits in front of a machine, rests the heel of his or her hand on the gaming machine with a finger on a "spin reels" button and repetitively presses this button with his or her wrist cocked in this position, he or she can develop a repetitive stress injury. Accordingly, various embodiments of the present invention provide non-contact input interfaces that allow players to use more natural modes of communicating information to a gaming machine. Furthermore, if more than one mode is included on a particular gaming machine, a player can switch between these modes to reduce the risk of developing a repetitive stress injury in any of the modes.

The inputs allowed via the non-contact interface may be regulated in each gaming jurisdiction in which a gaming machine with a non-contact interface is deployed. The allowable inputs may vary from gaming jurisdiction to gaming jurisdiction. For example, for a voice interface, certain voice commands may be allowed/required in one jurisdiction but not another. The gaming machines of the present invention may be configurable such that by inputting the gaming jurisdiction where the gaming machine is located into the gaming machine or specifying it in a software package shipped with the gaming machine, the gaming machine may self-configure itself to comply with the regulations of the jurisdiction where it is located.

Another aspect of gaming machine operation that may also be regulated by a gaming jurisdiction is providing game history capabilities. For instance, for dispute resolution purposes, it is often desirable to be able to replay information from a past game, such as the outcome of a previous game on the gaming machine. With the non-contact interfaces of the present invention, it may be desirable to store information regarding inputs made through a non-contact interface and provide a capability of playing information regarding the input stored by the gaming machine.

As an example, for a non-contact voice interface that receives voice commands, the gaming machine may store a recording of each voice command or a portion of the voice commands received by the gaming machine during a game played on the gaming machine along with information regarding the game, such as the game outcome. An interface may be provided on the gaming machine that allows this information to recalled and output on the gaming machine.

In a dispute, a player may claim that the gaming machine operated incorrectly in response to a command they have provided or operated without the player inputting a command. Using the playback interface, an operator may be able to locate the command disputed by the player and play it back. For instance, for a voice command used during a gaming, the operator may be able use the playback interface to locate the particular command and play it back to the user to resolve the dispute.

Figure 2:
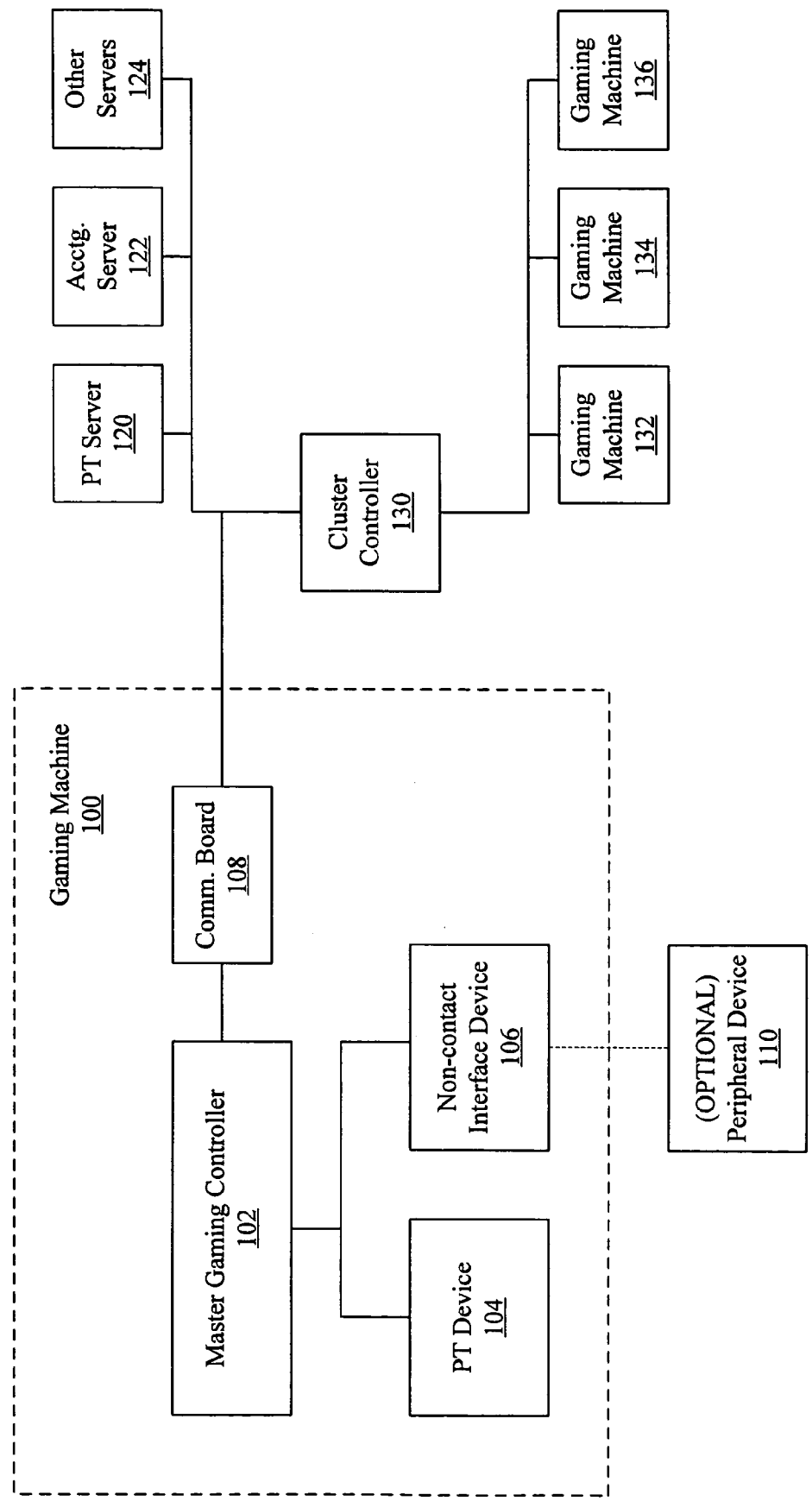
FIG. 2 is a block diagram of a gaming machine having a non-contact interface.

With reference to FIG. 2, shown is a block diagram of one exemplary embodiment of a gaming machine having a non-contact interface. In particular, gaming machine 100 includes a master gaming controller 102 that is used to present one or more games on the gaming machine 100. The master gaming controller 102 executes a number of gaming software programs to operate various gaming devices, such as player tracking device 104 and non-contact interface device 106, and other devices that are not shown, such as coin hoppers, bill validators, coin acceptors, speakers, printers, lights, displays, and the like. The displays may be mechanical displays (e.g., slot reels), video displays or combinations thereof. In addition, the master gaming controller 102 may execute gaming software that enables complex graphical renderings to be presented on the displays as part of a game outcome presentation.

In the present embodiment, the player tracking device 104 can receive player tracking information such as a player tracking identification number. The player tracking device 104 can be a card reader that accepts player tracking cards, smart cards, a Bluetooth™ device that interacts with a wireless player tracking mechanism worn or carried by a player, and the like. Non-contact interface device 106 is an input/output device that allows the player and gaming machine 100 to communicate with each other without requiring the player to touch the gaming machine 100. For instance, non-contact interface device 106 can be an eye motion recognition device, hand motion recognition device, voice recognition device, or the like. An example of an exemplary eye motion recognition device is described in more detail below with regard to FIGS. 3 and 4. In addition, an example of a hand motion recognition device is described in more detail below with regard to FIG. 5. Alternatively, non-contact interface device can be a receiver for signals from a peripheral device 110 such as a projected keyboard, a personal digital assistant, a cell phone, or the like, that is located remotely from the machine. As depicted, the peripheral device 110 is optional, depending on what type of input mechanism is used.

In the present embodiment, the master gaming controller 102 executes various gaming software programs using one or more processors. During execution, a software program may be temporarily loaded into a random access memory (RAM). Various gaming software programs, loaded into RAM for execution, may be managed as "processes" by the gaming machine's operating system. The gaming machine's operating system may also perform process scheduling and memory management. An example of an operating system that may be used with the present embodiment is the QNX operating system provided by QNX Software Systems, LTD (Kanata, Ontario, Canada). Depending on the operational state of the gaming machine, the number and types of software programs loaded in the RAM may vary with time. For instance, when a game is presented, particular software programs used to present a complex graphical presentation may be loaded into the RAM. However, when the gaming machine 100 is idle, these graphical software programs may not be loaded into the RAM.

The gaming software programs may be stored on one or more types of file storage media, such as a file storage device or EPROM. The file storage device may be a hard-drive, CD-ROM, CD-RW, CD-DVD, DVD-R, DVD-RW, static RAM, flash drive, compact flash drive, flash memory, memory stick, EPROM, and the like, or combinations thereof. The file storage media may be located on the gaming machine 100, on other gaming machines, on remote servers, or on combinations thereof. Furthermore, the file storage media can store data files, including executables such as gaming software programs. In addition, the data files can include data generated during routine operation of the gaming machine 100 such as game state information, which can include the number of games played, the number of credits, the number of coins deposited, the number of jackpots, and the like.

In the present embodiment, the master gaming controller 102 may execute gaming software that enables communication between gaming machine 100 and other gaming devices located outside of gaming machine 100, such as player tracking servers 120, accounting servers 122, other servers 124, cluster controllers 130, and other gaming machines 132, 134, and 136. Any number of these outside gaming devices can be included in a gaming machine system, depending on the application. Gaming machine 100 can communicate with these outside devices through a network connection via main communication board 108.

Figure 3:
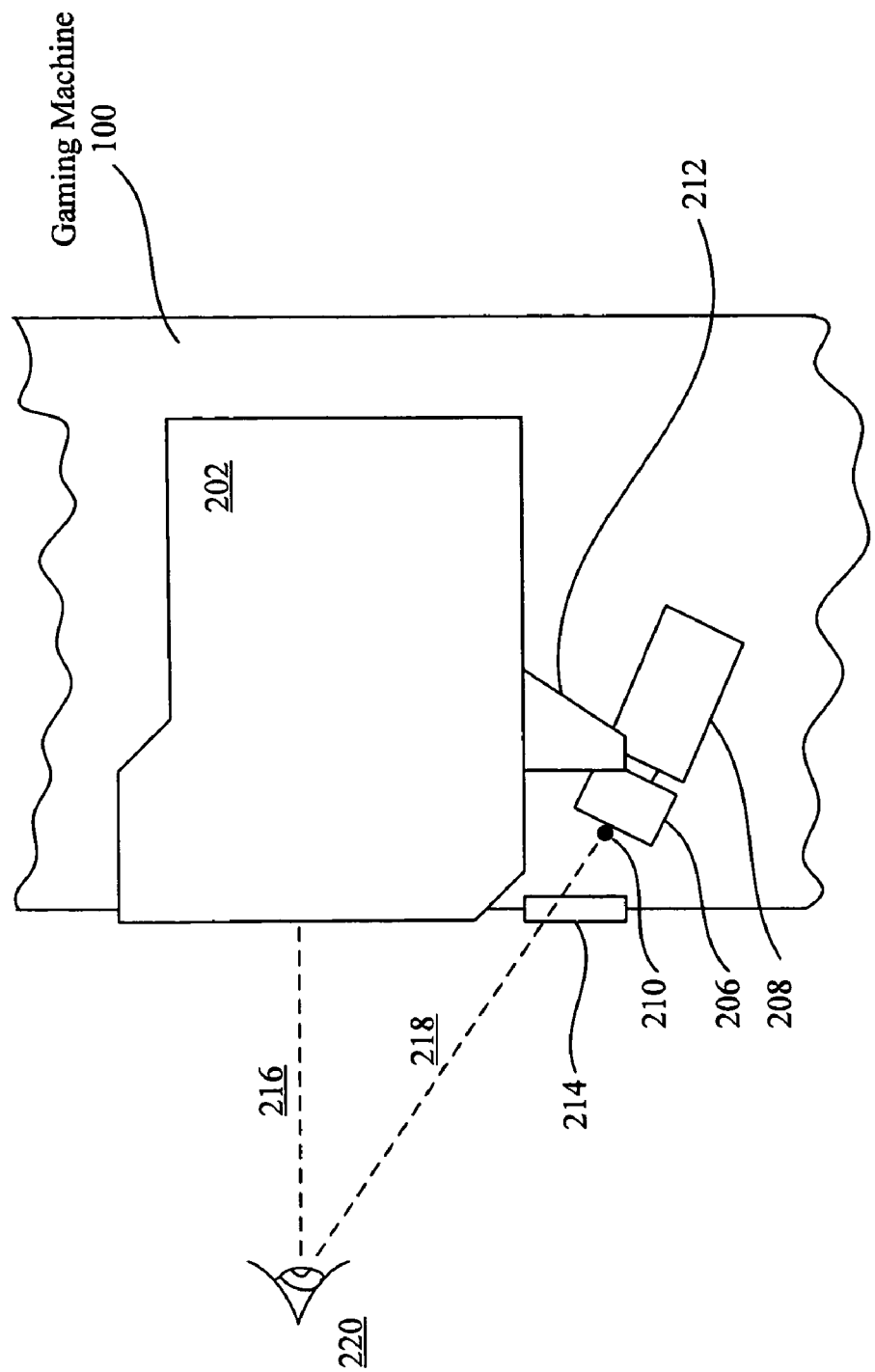
FIG. 3 is a diagrammatic representation of a gaming machine having a non-contact interface for eye motion recognition.
Figure 4:
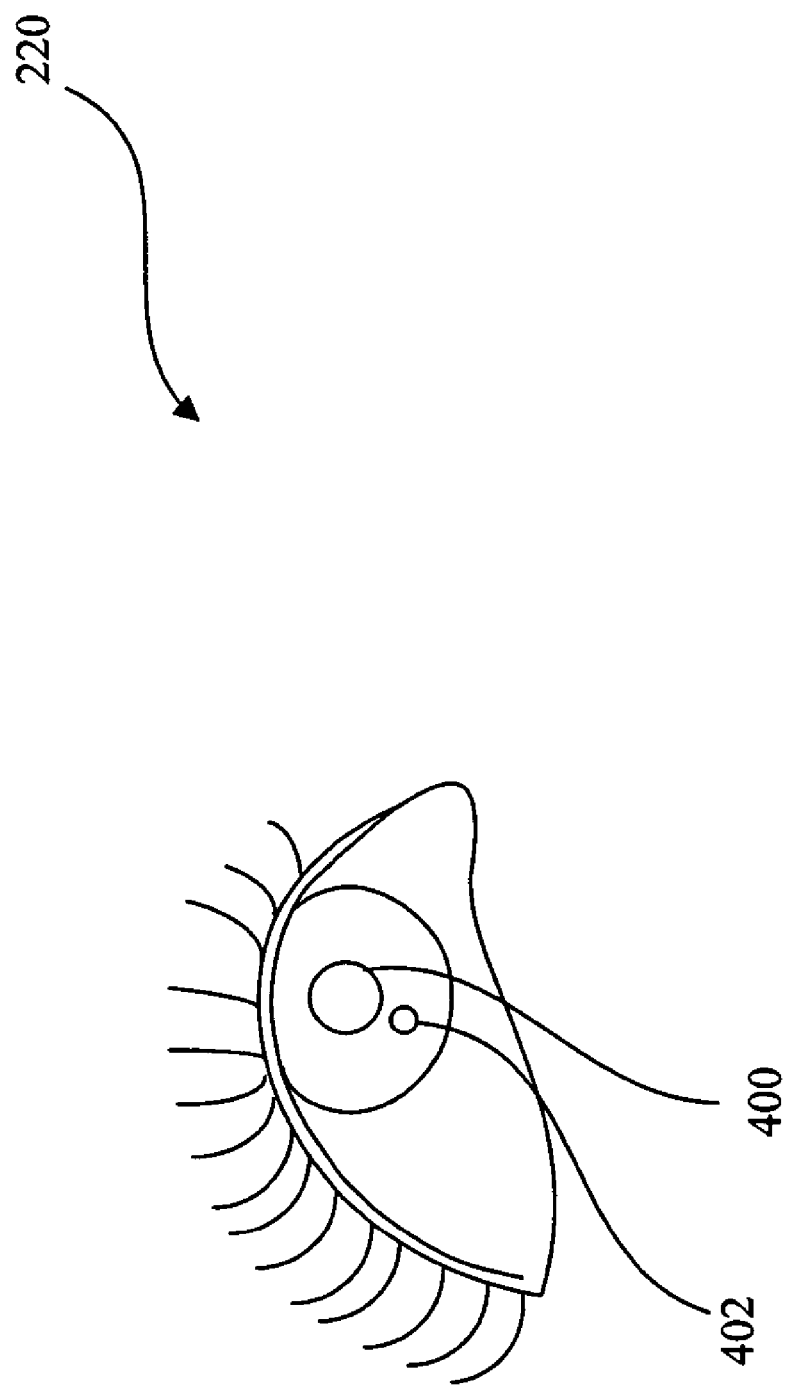
FIG. 4 is a diagrammatic representation of an LED-illuminated eye.

With reference to FIG. 3, shown is a diagrammatic representation of one embodiment of the gaming machine having a non-contact interface for eye motion recognition. In the present embodiment a cutaway side view of a portion of gaming machine 100 is shown. As shown, monitor 202 is located within gaming machine 100. Bracket 212 can be coupled to monitor 202 and an eye motion recognition device that includes LED 210, lens 206, and camera 208. LED 210 can be a low-power infrared light emitting diode that can be located at the center of lens 206. LED 210 can illuminate a player's eye such that a small, very bright reflection off the surface of the eye's cornea is generated. At the same time, LED 210 can illuminate the players pupil by reflecting light off of the eye's retina, also referred to as the bright pupil effect. In the present embodiment, the reflections from the player's eye 220 in response to LED 210 is shown generally along 218. These reflections can be used to calculate the player's gaze point on display 210 along line of sight 216. More particularly, with reference to FIG. 4, shown is an eye 220 having a corneal reflection 402 and bright pupil 400. Based on the relative positions of the pupil center 400 and a corneal reflection 402, the master gaming controller 102 (FIG. 2) can calculate the coordinates of the player's gaze point on monitor 202.

Referring again to FIG. 3, camera 208 can be a video camera that continually observes the player's eye 220 such that the player's gaze point can be determined continuously or at any specified time. For instance, camera 208 can be a CCD camera, which is available from Logitech (Fremont, Calif.), Linksys (Irvine, Calif.) or SR Research LTD (Osgoode, Ontario, Canada, www.eyelinkinfo.com). Using images received from camera 208, master gaming controller 102 can determine the eye's orientation to project the players gaze point on the display 204 using specialized image processing software. The player can be oriented between about 18 and 24 inches from display 204. In some examples, the system can predict the players gaze point with an average accuracy of better than about one-quarter of an inch. Furthermore, the system can also generate information about the players pupil diameter, blinking, and eye fixations (station position non-moving), which can be useful for other eye tracking applications. In the present embodiment shown in FIG. 3, the eye motion recognition device can be located within gaming machine 100, and can send and receive signals to eye 220 through transparent interface 214, which can be a "window" of any shape made of glass, acrylic, Plexiglas, or the like. However, it should be recognized that the eye motion recognition device can be located on or near the gaming machine, and can be positioned at different locations relative to the player. For instance, the camera can be located above the monitor in some embodiments.

One example of an eye motion recognition device that can be used with various embodiments of the present invention is the Eyegaze System, available from LC Technologies (Fairfax, Va., www.eyegaze.com). The Eyegaze computer system was designed for use by people with severe motor disabilities. The Eyegaze System requires no contact with the player. Other video image processing systems can also be used with the present embodiment. Other types of eye motion recognition devices can also be used, such as galvanometric sensors that measure voltages across the eye.

Although various eye motion recognition devices can be headmounted or remote, it is preferable to use a remote, non-contact, eye motion recognition device for a gaming machine. With several players using a particular gaming machine sequentially, a non-contact interface provides a convenient and efficient way to interact with players. If a head-mounted system is used, players may be discouraged from using this system because the headset can be intrusive and unsanitary. Furthermore, by having additional equipment, more repairs and replacements may be necessary, which can be expensive for a gaming establishment. However, head-mounted systems can also be used depending on the application.

Figure 5:
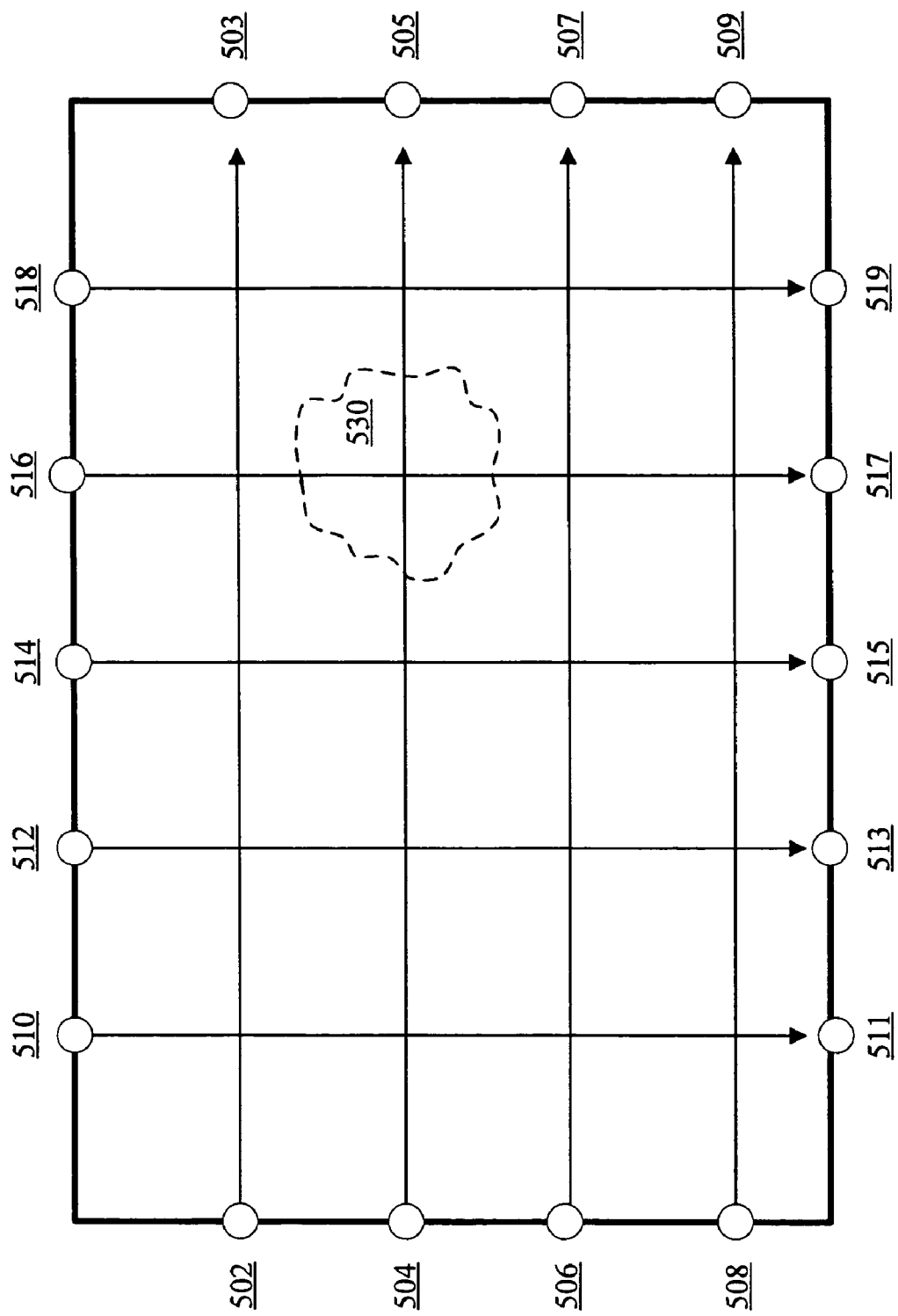
FIG. 5 is a diagrammatic representation of a sensor curtain that can be used as a non-contact interface for hand motion recognition.

With reference to FIG. 5, shown is a diagrammatic representation of an exemplary sensor curtain that can be used as a non-contact interface for hand motion recognition according to one embodiment of the present invention. The sensor curtain can be made of bars that form the perimeter of the hand motion recognition interface. Along two of the bars, signals can be emitted from emitters 502, 504, 506, 508, 510, 512, 514, 516 and 518. The signals can then be received by receivers 503, 505, 507, 509, 511, 513, 515, 517 and 519 located along the opposite bars. The signals can be infrared, radio-wave, ultrasonic, or other signals, including images from digital cameras.

When an object 530 is placed within the sensor curtain region, the object 530 can interrupt signals in the region. In the present embodiment, object 530 intersects the signal between emitter 516 and receiver 517 and the signal between emitter 504 and receiver 505. When it is detected that receivers 505 and 517 have not received a signal emitted by emitters 504 and 516, respectively, the coordinates of object 530 can be determined from the intersection of the two signals. When the sensor curtain is placed in front of a gaming machine 100, the gaming machine 100 can receive hand motion input from a player. In particular, a player can use his or her hands, fingers, stylus, or the like, to interrupt signals emitted by the sensor curtain. The coordinates of these interrupted signals can be interpreted by the gaming machine 100 as input. For instance, the coordinates of the sensor curtain can correspond to coordinates on a display screen. As a player points in a region proximate to the screen, the projection of his or her finger can be detected by the sensor curtain and displayed on the screen. One supplier of such a device is Keyence America (Woodcliff Lake, N.J., www.keyence.com)

Although a certain number of emitters and receivers are shown, any number of emitters and receivers can be used, depending on how finely the coordinates must be detected for a particular application. In addition, although the sensor curtain is shown in two dimensions, three-dimensional sensors can also be used. In one example, two cameras can be used to detect motion in three dimensions: one camera for x-y and another camera for y-z. If a three-dimensional system is used, features such as sign language recognition can be employed.

In addition to eye motion recognition devices and hand motion recognition devices, various other non-contact input devices can be used according to various embodiments of the present invention. For instance, voice recognition devices can be used to interpret commands, and the like. These voice recognition devices can be configured to accept one or more languages, depending on the application. Furthermore, the voice recognition devices can include features such as echo cancellation, noise cancellation, or the like, to reduce the amount of interference with player input by ambient noises. Also, unidirectional microphones can be used to reduce the amount of ambient noise detected. In another example, an image recognition system can be used to read lips, sign language, or other movements. Yet another example includes a virtual keyboard or switch panel. One example of a virtual keyboard that can be used is the Integrated Keyboard Device available from Canesta, Inc. (San Jose, Calif.).

Another example includes a virtual touch screen that can be activated when a player hovers his or her hand or finger in a region in front of the display. A light curtain may be used to generate the virtual touch screen. In another example, a virtual touch screen can be generated using a CCD camera.

In yet other examples, non-contact interface devices can interact with peripheral devices 110 (FIG. 2) such as touchpads, personal digital assistants (PDAs), cellphones, pointers, gloves, and the like. For instance, a touchpad can be located in the arm rest of a chair that is positioned in front of a gaming machine. The touchpad can be located remotely from the gaming machine 100, and can communicate via an interface such as a wireless interface. Similarly, PDAs and cellphones can be used to communicate wirelessly with a gaming machine 100. A player can use a stylus or a finger to input information into the gaming machine through a PDA screen. The PDA beams the data to a gaming machine via an IR or RF interface. An example of a PDA that communicates with a wireless interface is provided in U.S. patent application Ser. No. 09/961,051 entitled "GAME SERVICE INTERFACES FOR PLAYER TRACKING TOUCH SCREEN DISPLAY," filed Sep. 20, 2001, which is incorporated herein by reference in its entirety for all purposes.

Alternatively, various buttons of a cell phone can correspond to inputs on the gaming machine 100. The PDAs and cellphones can be handheld or placed in a docking station attached to a chair, or the like, located in front of the gaming machine 100. In addition, a pointer, such as a laser pointer can be used. The laser input can be detected by the gaming machine using a raster scan, or the like. Still another example can include a haptic interface. For instance, a glove can be fit over the hand or fingertip of a player and used with items such as bar-code sensors that can emit a complex pattern within a region, like a rotating cone or turret-shaped region, which can detect motion of the glove within this region. In another example, a glove having resistive ink bend sensors can be used. The sensors can be used to relay the position of the glove. Furthermore, ultrasonic tracking can be used to provide the x-y-z coordinates of the glove. An example of a glove using resistive ink bend sensors is the Nintendo Power Glove, available from Nintendo Co., Ltd. (Kyoto, Japan). Various peripheral devices can communicate with the non-contact interface devices by a wireless, or other remote connection. By using these types of input devices, the player can reduce the amount of reaching towards the gaming machine 100, which can cause strain and possibly even injury during extended game play.

Each of the devices described can reduce the amount of fatigue that players experience during game play, thereby increasing the players' enjoyment of the gaming activities. Furthermore, these devices can allow players ways and repetitive stress injuries or other physical impairments to engage in game play. In addition to the devices described above, various other input devices can be used as part of the non-contact interface with gaming machine 100.

Figure 6:
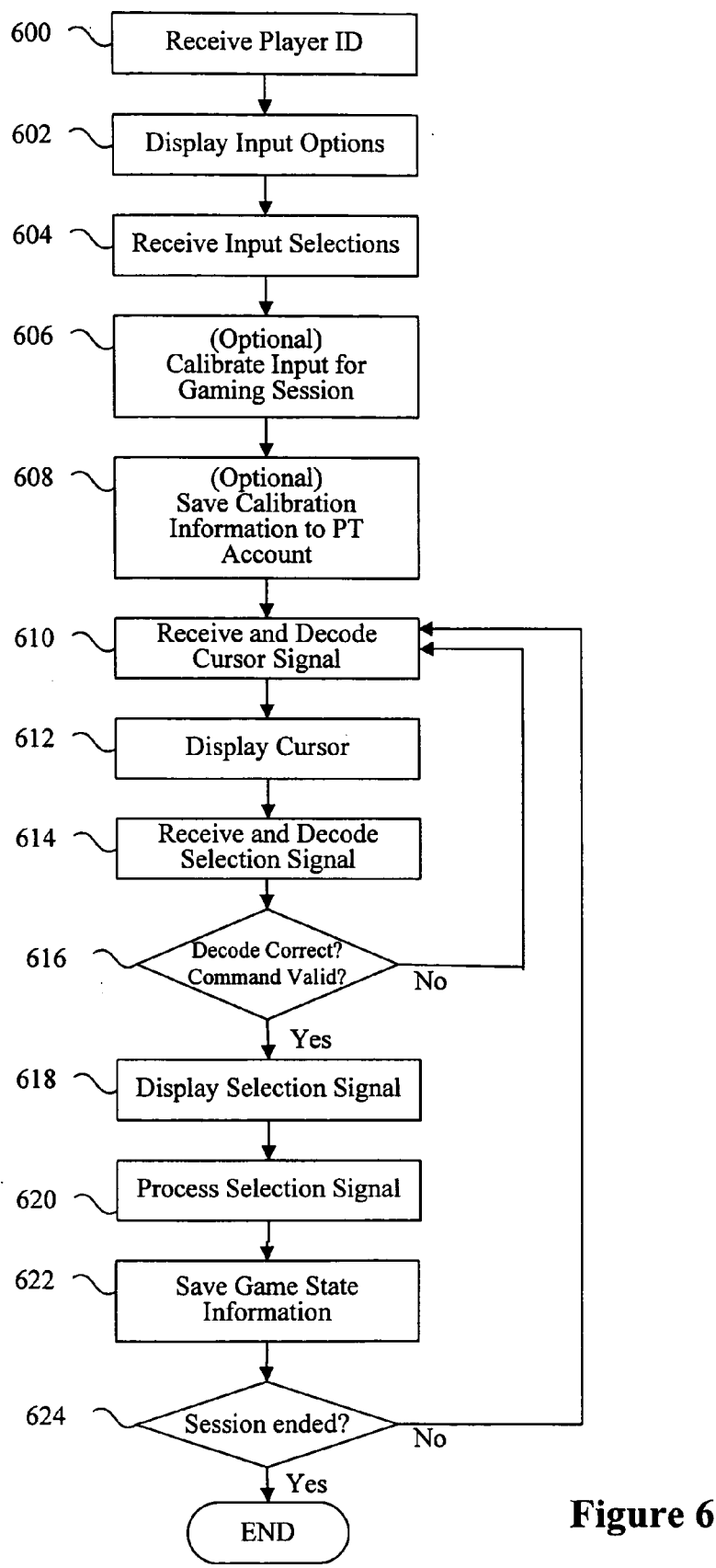
FIG. 6 is a flow diagram depicting a process for providing input to a gaming machine using a non-contact interface.

With reference to FIG. 6, shown is a flow diagram of a process for providing input to a gaming machine using a non-contact interface, according to one embodiment. At 600, player tracking identification information can be received. For instance, a player can insert a player tracking card into a card reader on the gaming machine 100 and a player tracking identification number can be read from the player tracking card. This player tracking identification number can be used to access a database that includes account information associated with the player. Alternatively, various player tracking information can be stored directly on the card. In other examples, Bluetooth-enabled devices, as well as other devices, can be used to communicate player tracking identification information to the gaming machine 100.

Figure 8:
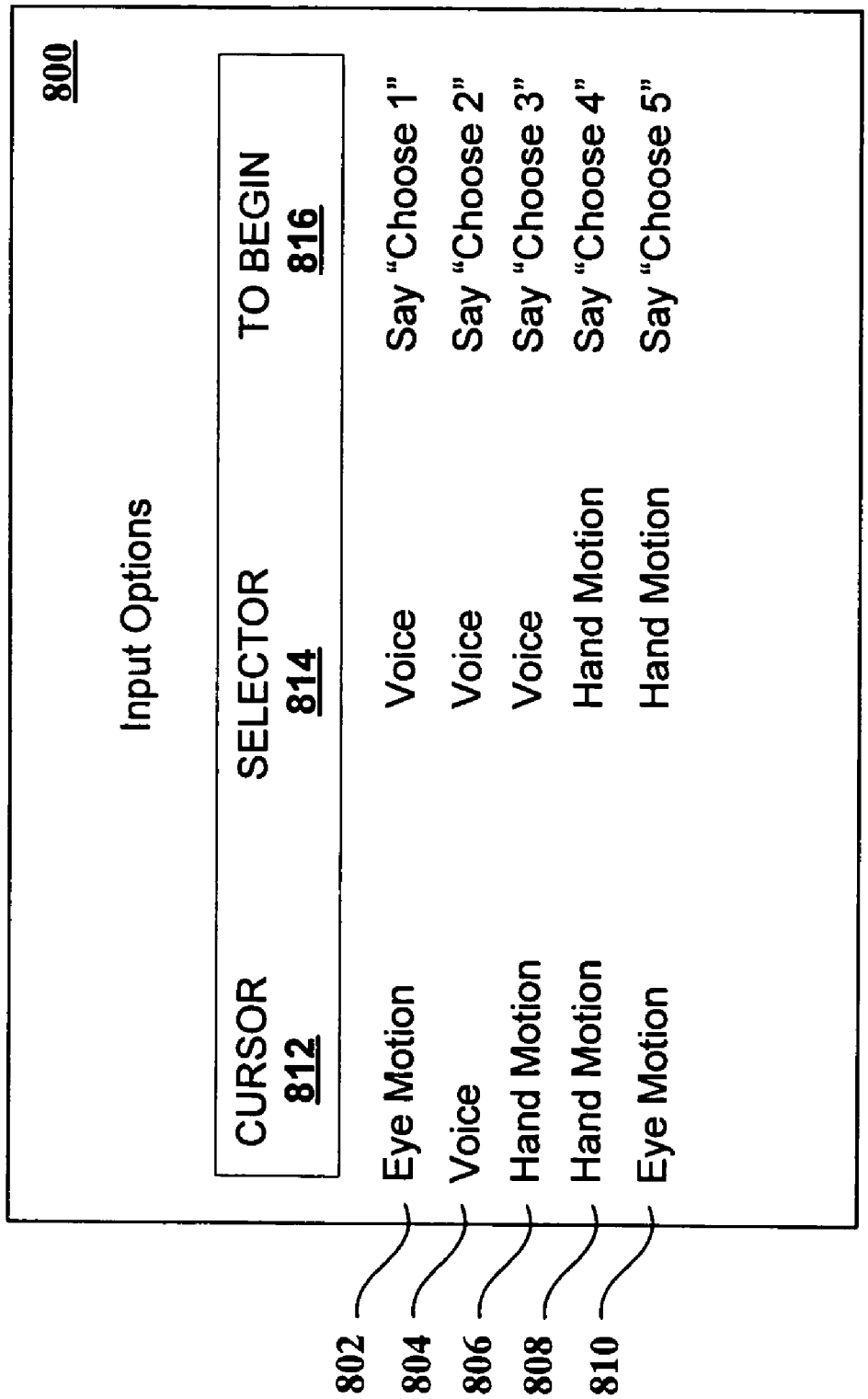
FIG. 8 is a diagrammatic representation of an interface displaying options for non-contact input to a gaming machine.

Next, input options can be displayed to a player at 602. An example of an input options screen that can be displayed to a player is shown in FIG. 8. With reference to FIG. 8, input options screen 800 includes three columns: cursor 812, selector 814, and "to begin" 816. According to various embodiments, input to the gaming machine 100 can include a two components: a cursor and a selector. The cursor indicates where on the gaming machine display a player may be pointing (e.g. by gaze point, hand motion, etc.). Once the cursor is on a button or other portion of the screen that the player wishes to select, then the player can use a selector to choose this button or other portion of the screen. For example, in row 802, the cursor 812 is controlled by the players player's eye motion, and selections are made with voice commands. Accordingly, as a player looks at a "spin" button on a video slot machine, a cursor can be displayed on the button, and the player can choose the "spin" button by using a voice command such as "play that," "select that," or the like. In order to activate the input option in row 802, the player can say "choose 1" as indicated in column 816. Similarly, rows 804 through 810 include various combinations of cursors and selectors using eye motion, voice commands, and hand motion. In some embodiments, the cursor on selector can be integrated. For instance, a single voice command can be used to make selections without using a cursor beforehand. In one example, a player can say "spin the reels" to select the spin button. Other combinations and types of inputs can also be used for cursor and selector commands. In addition, other types of input can be used "to begin" a gaming session.

In the present embodiment, once the input options are displayed at 602, and input selections are received at 604, then the player's input can be calibrated for the gaming session. For instance, the player can be prompted to input a voice sample, which can be used to determine ambient noise conditions for the gaming session if voice recognition is used. Using this information, the gaming machine can use noise cancellation technologies to filter out irrelevant sounds during the gaming session. Further, a voice "signature" may also be used to verify or authenticate a command. This verification may be used to avoid a false triggering of a command such as from a bystander or a nearby player on an adjacent gaming machine.

Similarly, the player can be prompted to look in certain directions to calibrate eye motion recognition devices if this type of input is used. The gaming machine can use this information to determine the player's orientation to the gaming machine, and to interpret the player's eye motions according to the player's height, head tilt, etc. Various player input samples can be obtained to calibrate the non-contact interface devices for a gaming session.

If the player has not used non-contact interface devices for input before, the player can "teach" the gaming machine to recognize his or her signals. For instance, a player can be prompted to read aloud a paragraph of text in order to allow the gaming machine to calibrate its recognition of the player's voice in association with various words or sounds. Although standard signals can be requested of the player, in some embodiments, players can create their own personalized signals. For instance, if sign language is used, the player may also be able to create his or her own set of hand gestures for various commands. The results of this "teach mode," which can be referred to as personalization, can be stored to the player tracking account associated with the player. In some embodiments, the "teach mode" may be available at locations other than a gaming machine, such as a kiosk, so that players can train the gaming machine devices without using valuable gaming machine time that can otherwise be used to provide actual game play.

In addition, authentication of the player can be performed before or during calibration. For instance, if voice recognition is used, the player's voice sample provided during the current gaming session can be compared to a voice sample stored as player tracking account information for the player. If the voice samples match, the player can be authenticated. To prevent someone from recording someone else's voice and using it in the authentication process, the player may be requested to provide a voice sample of a random phrase. The random phrase may be generated and displayed on the gaming machine.

Once the calibration information is received, then the calibration information can be saved to the player tracking account associated with the player. This calibration information can be used as updated information for calibration or authentication purposes in the present and subsequent gaming sessions. However, calibration may not be necessary for some applications.

Figure 9A:
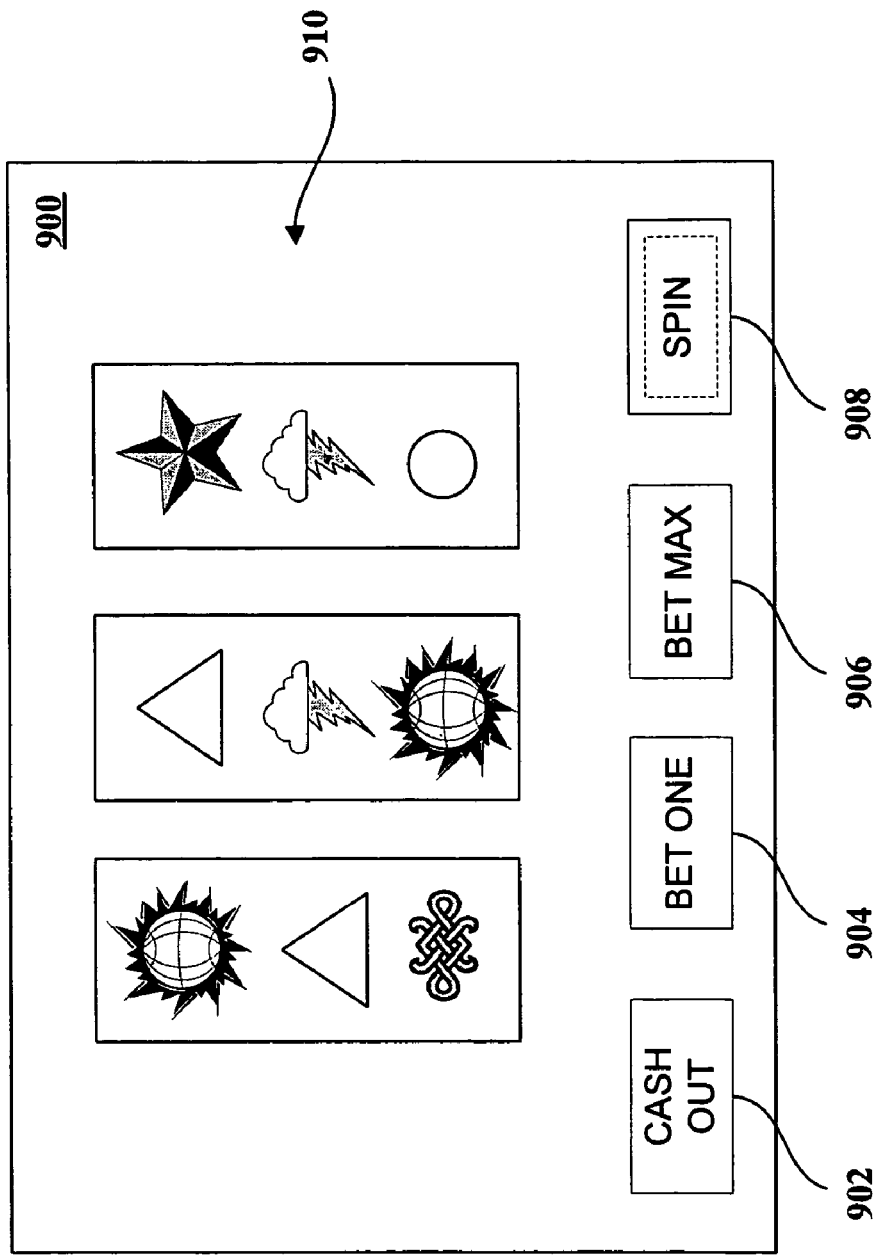
FIG. 9A is a diagrammatic representation of an interface displaying a cursor signal.
Figure 9B:
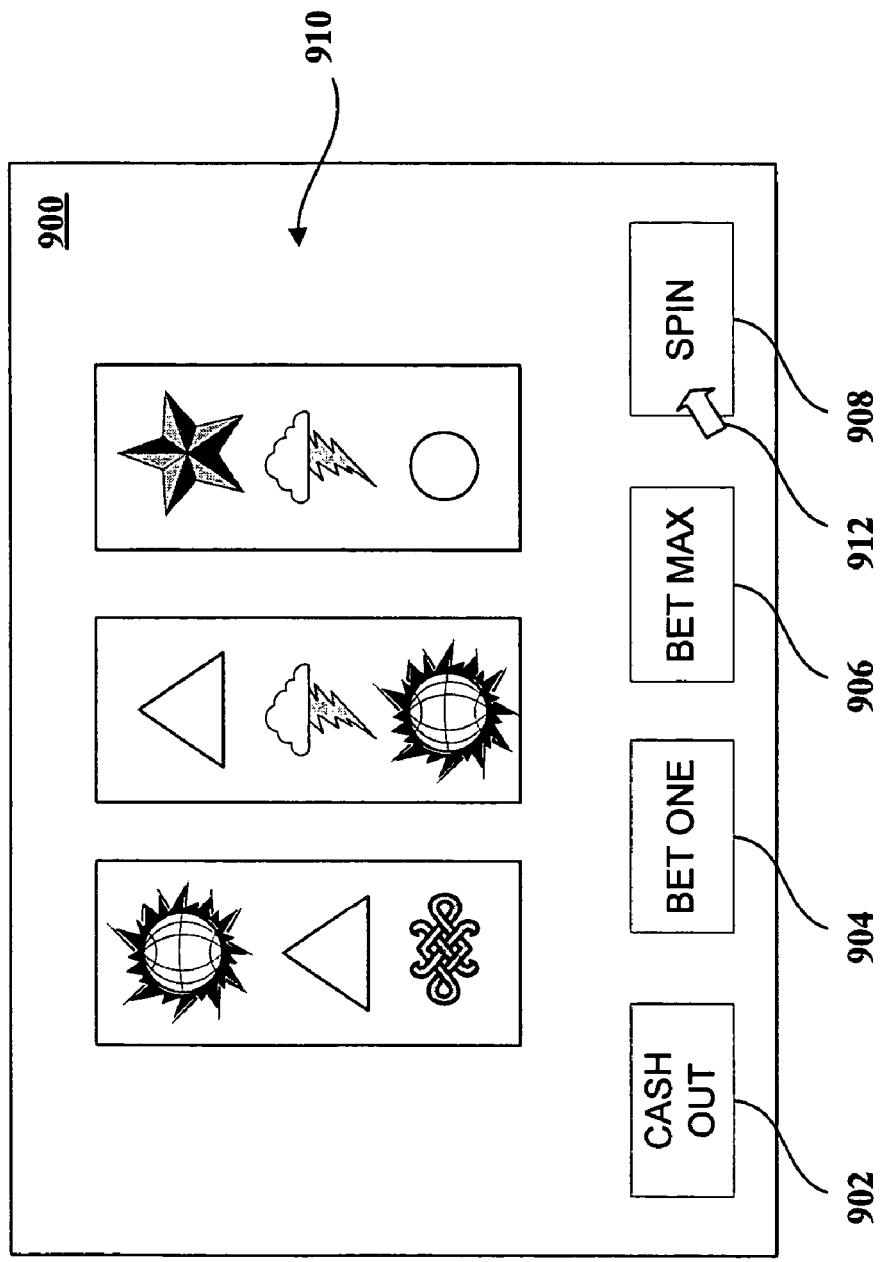
FIG. 9B is a diagrammatic representation of an interface displaying another cursor signal.

Next, a game of chance can be displayed on the gaming machine 100. The player's cursor input can be received and decoded continuously. Item 610. Based on this input, the cursor can be displayed on the display screen. Item 612. Two examples of cursor displays are shown in FIGS. 9A and 9B, respectively. With reference to FIG. 9A, shown is a diagrammatic representation of an interface displaying a cursor according to one embodiment. The interface 900 can be provided on a display screen of the gaming machine 100. The interface can include a game presentation region 910, and various input regions 902, 904, 906, and 908. The game presentation region 910 can include video slot reels as shown, or can include any other game of chance, such as poker cards, and the like. Furthermore, the game presentation region 910 can display bonus games at various times. These bonus games can be separate games such as puzzles, video games, and the like. The input regions can be various buttons that are selectable for a particular game. For instance, shown is a cash out button 902, a bet one credit button 904, a bet maximum credit button 906, and a spin button 908. At various times during the gaming session, some or all of these buttons can be inactive. For instance, once the reels are spinning, the buttons may not be selectable. When the buttons are not selectable, input for that region will not be accepted. In some embodiments, the inactive buttons may be displayed as a different color or manner from active buttons. In the embodiment shown, the cursor is on the spin button 908, as indicated by the dotted line. With reference to FIG. 9B, an alternative embodiment is shown. This embodiment is similar to the embodiment shown in FIG. 9A, except that the cursor 912 is shown as an arrow. Any type of cursor can be used, such as a cross-hair, an icon, or the like. In some examples, the cursor can be displayed only when it is in a selectable region. In other examples, the cursor can be displayed at whatever location the player's input indicates, regardless of whether the cursor region is active.

Returning to FIG. 6, once the cursor is displayed, the player can select an active region. In particular, based on the input mode for the selector, a selection signal from the player can be received and decoded. Item 614. Next, it can be determined whether the selection signal was decoded correctly at 616 and in addition whether the command is valid. For instance, a command may not be recognized or available on the gaming machine. Further, a recognized command may not be valid for a particular situation, such a command to initiate a game when there are no credits on the gaming machine.

In particular, it can be determined whether the received signal was a result of ambient noise or motion or whether the signal was intended as input using the personalization or calibration files associated with the player. In addition, the calibration files can be used to adapt the received signal. For instance, if the player's speech was slurred in the voice command, or if the player is seated at a different height, the signal can be adapted or otherwise translated to account for this "error." In some examples, the player can be asked to confirm a selection, especially when it relates to a critical game event. For instance, when a selection signal is received for "cash out," the player can be asked to confirm this action with a specified mode of input when the message "Are you sure you want to cash out?" is communicated to the player.

Figure 10:
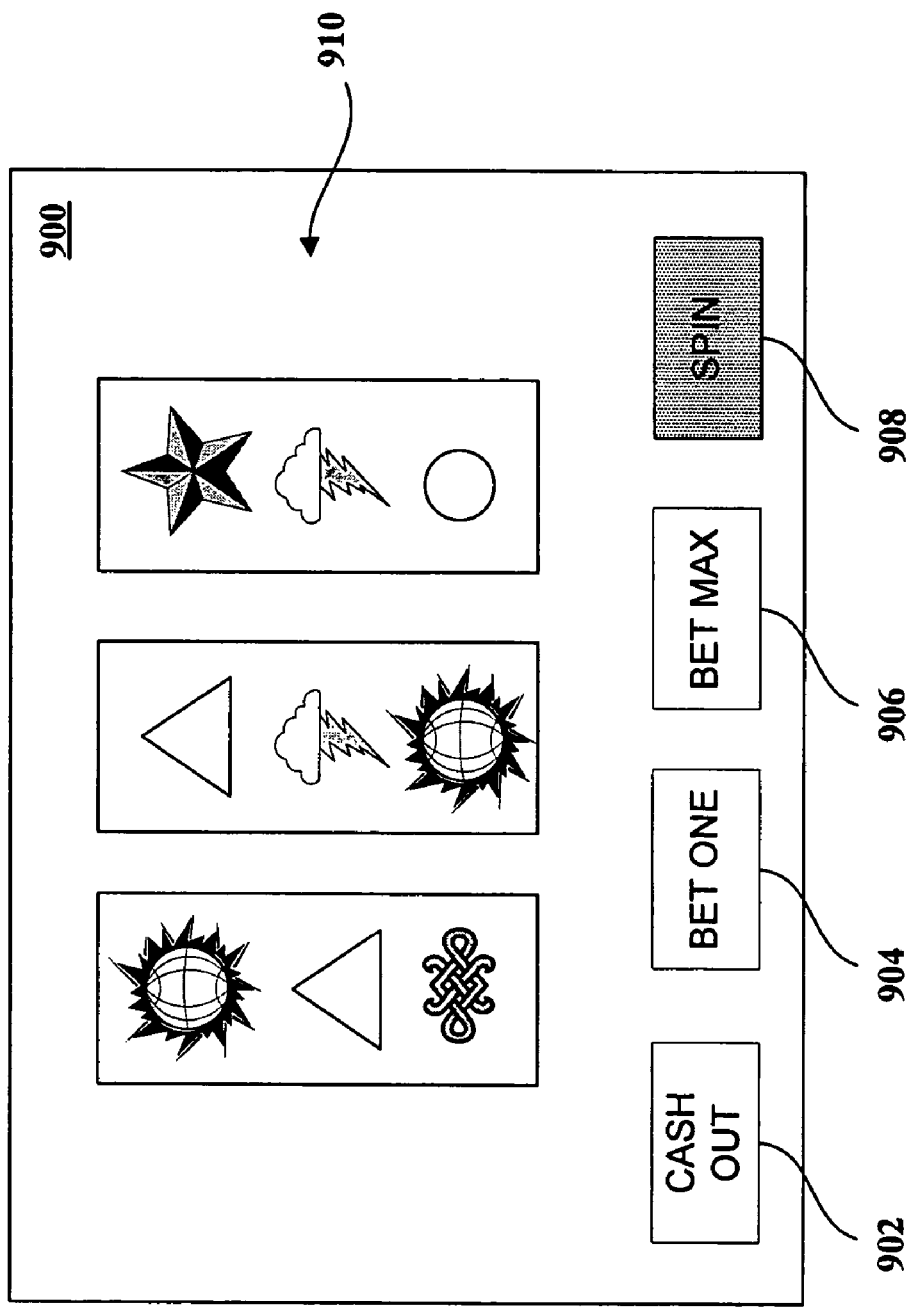
FIG. 10 is a diagrammatic representation of an interface displaying a selection signal.

If it is determined that the decoded signal is not correct or the command is not valid, then the process continues at 610. However, if it is determined that the decoded signal is correct, then the selection is displayed. With reference to FIG. 10, shown is a diagrammatic representation of an interface displaying a selection signal according to one embodiment. This embodiment is similar to the embodiment shown in FIG. 9A, except that the selected spin button 908 is shown in a different color or manner when the selection is confirmed. The selected region can be shown in a different color, shape, etc. In addition, if a button is selected, the button can appear depressed when it is selected, like when a physical button is pressed.

Next, referring back to FIG. 6, the selection signal is processed at 620. For instance, according to the embodiment shown in FIG. 10, the command to "spin reels" can be processed by the gaming machine 100. At 622, the selection can be saved as game state information. This game state information can be saved in the event of a power failure, etc. Furthermore, this game state information can be used to confirm awards, to follow up with complaints, and the like.

Specifically, the gaming machine can include gaming machine software logic designed to generate a series of game states where critical game data generated during each game state is stored in a non-volatile memory device. The gaming machine does not advance to the next game state in a sequence of game states used to present a game until it confirms that the critical game data for the current game state has been stored in the non-volatile memory device. For a more detailed discussion of game state information, see U.S. application Ser. No. 09/690,931, "High Performance Battery Backed RAM," filed Oct. 17, 2000, which is incorporated herein in its entirety and for all purposes. Once the game state information is saved, the process can continue at 610 if the gaming session has not been ended due to selection of a "cash out" button, or the like. If the session is ended, then the process concludes. See item 624. In some embodiments, before the process concludes, the player tracking account information can be updated with calibration information based on the player's inputs during the gaming session.

Figure 7:
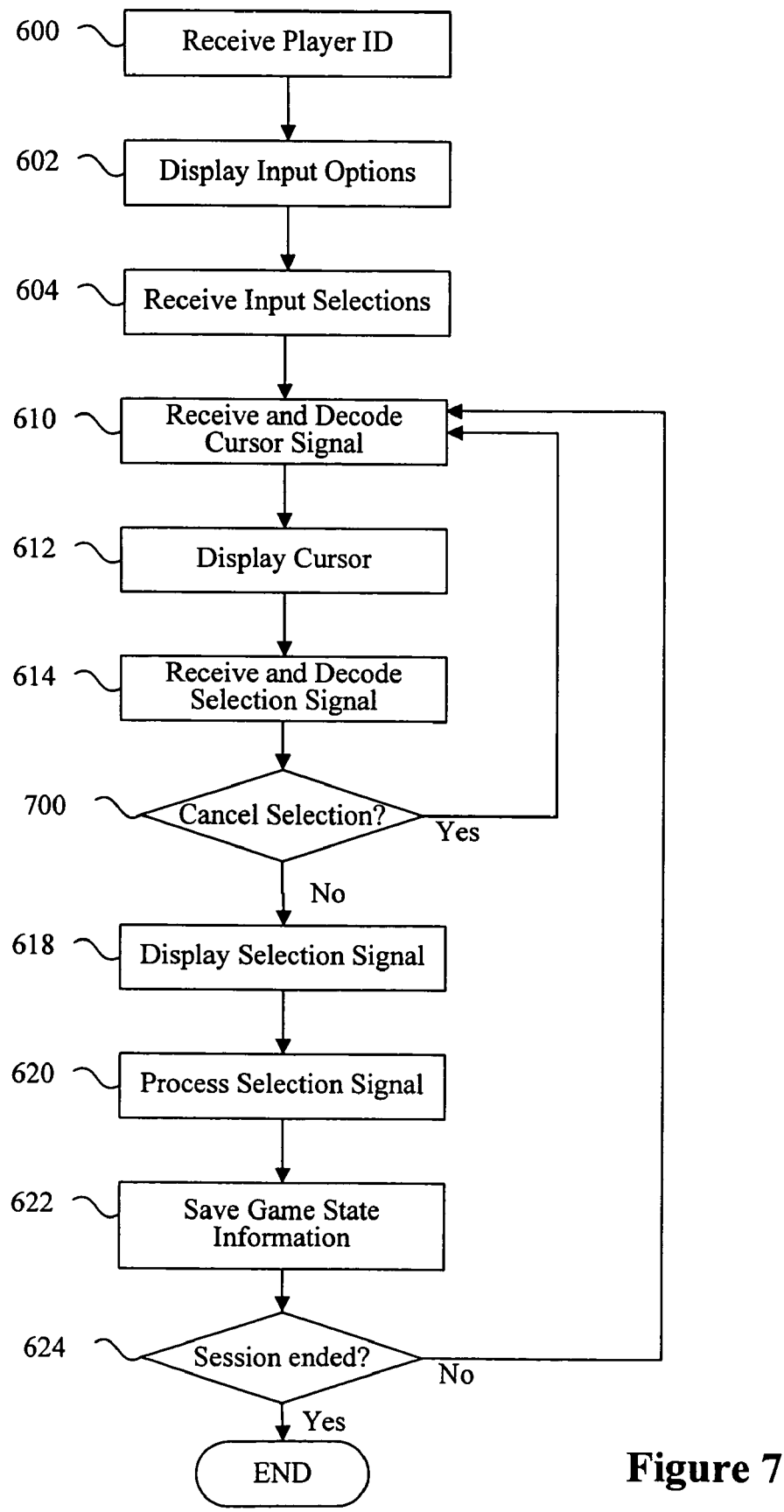
FIG. 7 is a flow diagram depicting a process for providing a secondary confirmation for an input selection.

With reference to FIG. 7, shown is a flow diagram of a process for providing a secondary confirmation for an input selection according to another embodiment. The present embodiment is similar to the embodiment shown in FIG. 6, except that the calibration items 606 and 608 are not shown, and the determination of whether the decoded signal is correct at 616 has been replaced with an option to cancel at 700. As described above, at 600, player tracking identification information can be received. Next, input options can be displayed to a player at 602 and input selections can be received at 604. A game of chance can then be displayed on the gaming machine 100. The player's cursor input can be received and decoded continuously. See item 610. Based on this input, the cursor can be displayed on the display screen. See item 612. Once the cursor is displayed, the player can select an active region. In particular, based on the input mode for the selector, a selection signal from the player can be received and decoded. Item 614. Next, the player can be presented with an option to cancel the selection before it is processed. Item 700. For instance, the player can either be asked to affirmatively confirm a selection or be provided an opportunity to select a button, or the like, to cancel the selection within a particular time frame. An example of a situation in which the cancel button can be used is when the player inadvertently selects the "max bet" button (FIGS. 9-10). Within a particular time frame, such as before "spin" is selected or during a fixed time frame like 10 seconds, the player can choose to cancel this selection by using an input such as by saying "cancel that," or "undo that." In one implementation, the cancel function can be similar to the "back" button on an Internet browser, which allows the player to see the previous screen. The option to cancel may not be available for all gaming selections. For instance, once the reels of a video slot game have begun to spin, the option may be unavailable. This can prevent players from trying to cancel a losing outcome after they know the outcome.

If the player cancels the selection, then the process continues at 610. However, if the player does not cancel the selection, then the selection is displayed at 618, as described above with regard to FIG. 6. The process then proceeds as described in FIG. 6 above, with the selection signal being processed at 620 and the selection being saved as game state information at 622. Once the game state information is saved, the process can continue at 610 if the gaming session has not been ended due to selection of a "cash out" button, or the like. See item 624. If the session has ended, then the process concludes. In some embodiments, before the process concludes, the player tracking account information can be updated with calibration information based on the player's inputs during the gaming session.

Various embodiments of the present invention provide many benefits. In particular, various embodiments of the present invention can be used to reduce player fatigue and increase the ease with which players can input information during gaming sessions. This can increase player enjoyment and can also provide efficient gaming sessions. Some of the embodiments require no peripheral devices provided by either the player or the gaming establishment. These embodiments allow the gaming establishment to reduce costs associated with maintaining these peripheral devices and reduce the barrier to entry for players. In addition, some of the embodiments provide input modes that are advantageous in different environments. For instance, if the environment is noisy, a hand motion recognition interface may be beneficial. Other benefits include allowing players with physical impairments to engage in game play. Additionally, various embodiments can be used with new classes of games that have not been implemented on traditional gaming machines. These games can be developed specifically for these non-contact interface devices. For instance, games such as "boxing," and the like, can be implemented on themed machines. Another benefit includes keeping the gaming machines cleaner by reducing or eliminating player contact with the machine. For example, because players may be situated farther from a gaming machine, they may be less likely to spill a drink, spread cigarette ashes, etc. on the gaming machine.

CONCLUSION

Although the above generally describes the present invention according to specific exemplary processes and apparatus, various modifications can be made without departing from the spirit and/or scope of the present invention. Therefore, the present invention should not be construed as being limited to the specific forms shown in the appended figures and described above.

What is claimed is:

1. A gaming machine comprising:
a player tracking device configured to receive player tracking information associated with a player;
a non-contact eye motion recognition device configured to capture eye motion data, wherein the gaming machine is configured to decode the captured eye motion data into inputs to the gaming machine for play of a game of chance on the gaming machine, wherein the captured eye motion data are decoded using personalization files stored as the player tracking information associated with the player, and wherein the gaming machine is configured to maintain a history of the captured eye motion data and the inputs decoded from the captured eye motion data within a memory;

a display configured to display a plurality of input options for selection by the player, the plurality of input options selectable based on the inputs to the gaming machine;

a master gaming controller configured to present one or more games of chance; and a playback interface controlled and generated by the master gaming controller, the playback interface configured to access the personalization files and the history of the captured eye motion data and, in the event of a dispute, to play back the captured eye motion data and play back a portion of the game of chance in which the inputs decoded from the captured eye motion data were used after the game of chance has been played.

2. The gaming machine of claim 1, wherein the player tracking information includes a player tracking identification number.

3. The gaming machine of claim 1, wherein the player tracking device further comprises one or more of a card reader, a wireless interface, a smart card reader, an RFID tag reader, a bar-code reader, a camera coupled to character recognition software, a microphone coupled to voice recognition software, or a combination thereof for transmitting the player tracking information.

4. The gaming machine of claim 1, wherein the gaming machine is configured to decode the captured eye motion data based on calibration information obtained during a gaming session.

5. A method for receiving input to a gaming machine comprising:

receiving, by the gaming machine, player tracking information associated with a player, wherein the player tracking information includes personalized non-contact game play eye motions;

determining, by the gaming machine, if the personalized non-contact game play eye motions are allowed within a current jurisdiction;

displaying a plurality of input options to the player, the plurality of input options associated with a non-contact eye motion recognition device;

associating a personalized non-contact game play eye motion with an input to the gaming machine;

receiving captured eye motion data from the non-contact eye motion recognition device, wherein the captured eye motion data is captured from eye motions of the player and the eye motions of the player include motions associated with the personalized non-contact game play eye motions;

decoding, by the gaming machine, the captured eye motion data using the player tracking information to provide the input to the gaming machine associated with the personalized non-contact game play eye motions; and storing a history of captured eye motion data and inputs decoded from the captured eye motion data and the personalized non-contact game play eye motions on a memory of the gaming machine, wherein the gaming machine is configured to locate an input and the captured eye motion data associated with the located input within the history and play back the located input and the captured eye motion data.

6. The method of claim 5, further comprising allowing an authorized operator to access the history in the event of a dispute.

7. The method of claim 6, further comprising locating and playing back a plurality of inputs and the captured eye motion data associated with the located inputs from the history stored on the memory.

* * * * *